July 7, 1959 L. H. FLORA ET AL 2,893,671
CABLE MOUNTING
Original Filed March 6, 1951
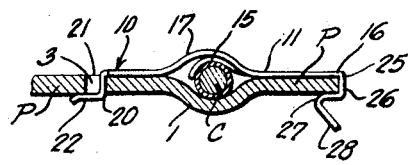
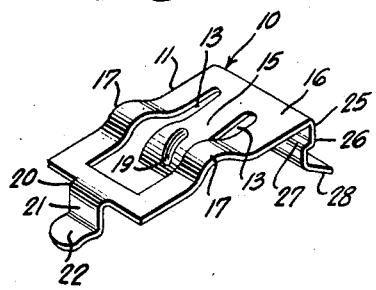
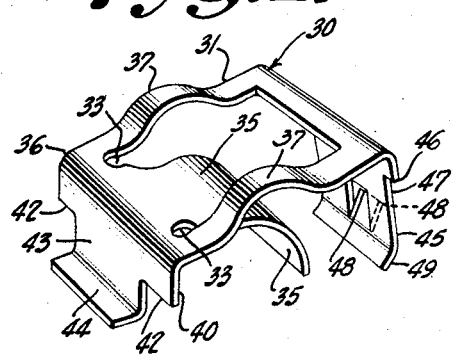
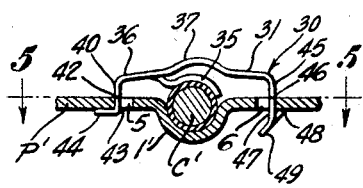
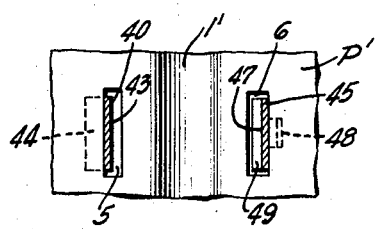
INVENTORS
LAURENCE H. FLORA
JOHN BALINT
BY *H. L. Lombard*
ATTORNEY

United States Patent Office 2,893,671
Patented July 7, 1959

2,893,671
CABLE MOUNTING

Laurence H. Flora and John Balint, Cleveland, Ohio, assignors to Tinnerman Products, Inc., Cleveland, Ohio, a corporation of Ohio Original application March 6, 1951, Serial No. 214,184, now Patent No. 2,712,917, dated July 12, 1955. Divided and this application June 22, 1955, Serial No. 517,152

4 Claims. (Cl. 248—73)

This invention relates to improvements in cable clips or fasteners and in the installation thereof for securing a cable or conduit or other rod-like object in a strong, durable and reliable mounting on a supporting part.

This application is a division of prior copending application Serial Number 214,184, filed March 6, 1951, now Patent No. 2,712,917.

In the use of the general type of cable clip or fastener in which one end of a metal strip is attached to a support and the other end extends free for securing a cable or similar object, the cable frequently slips loose from such free end of the clip as a result of vibration, or the like, and thereby becomes dislodged from its proper mounted position in an installation.

This insufficiency is overcome and avoided by the improved clip or fastener of this invention which comprises, in general, a base or body that straddles the cable, conduit or other object in mounted position and includes a pair of opposite leg members both of which are positively secured to a support on opposite sides of the cable in a manner whereby the cable is firmly and rigidly retained in mounted position on the support and is not subject to loosening or displacement from such mounted position under the most severe conditions of vibration, or the like.

A primary object of this invention, accordingly, is to provide an improved clip or fastener of this general character which comprises a metal body providing a strap-like base adapted to straddle or bridge the cable or other object to be mounted, and a pair of leg members depending from said base on opposite sides of said cable with one of said leg members comprising a hook which is interlocked in a hole or opening in the support and the other leg member including a resilient shoulder in snap fastened engagement with the support.

A further object of the invention is to provide an improved clip or fastener, such as described, in which the strap-like fastener base comprises a spring arm that resiliently engages the cable or other object to retain the same under continuously effective spring tension and which otherwise adapts the clip or fastener for use with cables and other objects of various sizes.

Another object of the invention is to provide a fastening installation embodying a clip or fastener in accordance with the foregoing and a supporting part having a well or groove receiving the cable or other object to retain the same against displacement in mounted position in cooperation with the improved clip or fastener securing the cable in such mounted position.

Further objects and advantages and other new and useful features in the construction, arrangement and general combination of elements of the invention will be readily apparent as the following description proceeds with reference to the accompanying drawings, for purposes of illustration but not of limitation, in which like reference characters designate like parts throughout and in which:

Fig. 1 is a sectional view of an assembly showing one form of the improved clip or fastener of the invention as applied over the marginal edge of a support to mount a cable or other object thereon; and, Fig. 2 is a perspective view of the clip or fastener shown employed in Fig. 1.

Fig. 3 is a sectional view of an assembly in which another form of clip or fastener is employed to secure a cable or other object along an inward area of a support by means of mated holes provided in said support;

Fig. 4 is an enlarged perspective view of the fastener shown employed in Fig. 3; and, Fig. 5 is a sectional view of Fig. 3 along line 5—5 showing the leg members formed from the free ends of the clip as received in and secured in mating holes in the support.

Referring now more particularly to the drawings, Figs. 1 and 2 disclose one form of the invention as provided for mounting a cable C or similar rod-like object adjacent the marginal edge of a supporting part P. The support P may be of any suitable metal, wood or plastic material, for example, but usually is in the form of a metallic plate or panel member. Preferably the support P is provided with a countersunk portion or is otherwise grooved to define a longitudinal well 1 which seats an adjacent portion of the cable C and prevents displacement thereof from mounted position. The support P is also provided with a hole 3 in a predetermined spacing from the edge of the panel and which is arranged for interlocking engagement with one free end portion of the clip while the other free end portion thereof is adapted for snap fastening engagement with the support as presently to be described.

The clip or fastener, designated generally 10, is a simplified inexpensive article of manufacture which may be readily provided from standard sheet metal strip stock with little loss or waste of material. The clip or fastener 10 may be made from any suitable sheet metal material but preferably that of a spring metal nature such as spring steel or cold rolled metal having spring-like characteristics. As best seen in Fig. 2, a blank or stamping of such character is designed to provide a base 11 having a cut-out area including a pair of spaced parallel slots 13 defining a spring arm 15 extending from adjacent the mid-portion of the fastener base 11 to a transverse portion 16 of said fastener base. The central side portions of the fastener base are provided with upwardly curved bridge portions or rounded corrugations 17 adapted to clear the cable or other object C in the applied position of the fastener while the free end of the spring arm 15 is similarly rounded or otherwise shaped to conform to the contour of the cable or object C so as to snugly engage the same in clamping relation therewith. In this regard, when the clip is used with armored cable, the spring arm is provided with one or more downwardly projecting detents 19, or the like, Fig. 2, adapted to seat in the grooves between adjacent convolutions of the armored cable to prevent axial shifting or displacement of the cable. In the present example, the detent 19 is formed by a rib-like depression defining the desired detent projecting from the clamping face of the spring arm 15. The spring arm 15, thus provided, is biased downwardly below the fastener base 11 in its normal untensioned relation such that it must be flexed upwardly in engagement with the cable C in the applied position of the fastener, thereby clamping the cable under continuously effective spring tension in the mounted position of the cable.

The fastener base or body 11 is provided at one end with an integral strip 20 extending free and bent downwardly and outwardly from the fastener base 11 in the manner of an outwardly projecting hook. The strip providing said leg member 20 is of a width slightly less than the width of the hole 3 in the support so as to be readily received therein and at its junction with the fastener base defines a vertical abutment or shoulder 21 for engaging the adjacent wall of the hole 3. The outwardly projecting hook portion 22 of said leg member is spaced from the fastener base 11 a distance approximating the thickness of the support P so as to snugly engage the underside of said support P. Said hook portion 22 otherwise is of a greater length than the hole 3 so that the free end thereof overlaps said hole 3 in the applied position of the clip and thus prevents removal of said hook portion 22 from the hole 3 in a direction axially of said hole. Preferably the extremity of said hook 22 terminates in an outwardly flared lip which facilitates the initial application of the hook over the marginal edge of the hole 3 at the underside of the support P.

A cooperating leg member 25 is provided from an opposite free end portion of the blank and is bent to project downwardly from the fastener base 11 in a manner to define a flange 26 serving as an abutment adjacent an inwardly projecting resilient shoulder 27 having an outwardly slanting guide portion 28 leading to said shoulder 27. The shoulder 27 is spaced from the fastener base 11 a distance equal to or slightly less than the thickness of the support P so as to snugly engage the underside thereof. The flange or abutment 26 is spaced from the abutment or shoulder 21 on the hook 20 a distance substantially equal to that between the edge of the support P and the nearest wall of the hole 3 engaged by the shoulder 21, such that said flange 26 and abutment 21 prevent lengthwise shifting of the clip in either direction from its applied position.

In completing an assembly in accordance with the invention, the support P is prepared with a longitudinal well 1 for seating the lower surface of the cable C along the path in which it extends in mounted position. A suitable number of holes 3 are provided in the support P in accordance with the number of clips 10 to be employed in the completed installation. The clips 10 straddle the cable C as seated in the longitudinal well 1, substantially as shown in Fig. 1, with both ends of a clip 10 positively secured to the support P in the fully applied position of the clip. The application of a clip 10 is easily and quickly effected simply by locating the clip in straddling relation to the cable C with the hook type leg member 20 in position to enter the hole 3 and the spring arm 15 in position to engage said cable C. The clip is canted upwardly as necessary for the hook portion 22 of said leg member 20 to enter and pass through the hole 3 to the underside of the support P. When the clip is lowered to the position shown in Fig. 1, the abutment or shoulder 21 on said leg member 20 is moved into engagement with the adjacent wall of the hole 3 while the hook portion 22 overlaps the opposite marginal portion of said hole 3 at the underside of the support P. In this relation, the curved end portion of the spring arm 15 engages the cable C and flexes upwardly from its downwardly biased untensioned relation as necessary to accommodate said cable C; at the same time, pressure is applied to the base 11 in the region of the cooperating leg member 25 to snap the same into engagement with the marginal edge of the support P. The action is such that the guide portion 28 cams against the marginal edge of the support P and causes a gradual outward flexing of said leg member 25 as necessary for the inwardly projecting shoulder 27 to clear the support P and snap inwardly into positive abutting relation with the underside of said support P, substantially as shown in Fig. 1.

In the final, fully applied position of the clip 10, said clip is positively secured to the support P at both its ends with the leg member 20 interlocked in the hole 3, as aforesaid, and the leg member 25 secured by its shoulder 27 in positive engagement with the marginal edge portion of said support P in a manner whereby the clip is not subject to loosening from applied position under the most severe conditions of vibration, or the like. The clip, as thus secured, straddles the cable C with the spring arm 15 engaging the upper surface of said cable under constant spring tension and with the lower surface of said cable seated in the longitudinal well 1 in the support P in mounted position on said support. The cable C, accordingly, is firmly and rigidly retained in such mounted position on the support against shifting or displacement in any direction. When the cable C is in the form of armored cable, or the like, the spring arm 15 of the clip is provided with one or more downwardly projecting detents 19, Fig. 2, which are received in the grooves between adjacent convolutions of the armored cable as an added resistance against lengthwise displacement or shifting of such armored cable from its proper mounted position on said support P.

In the event that it is necessary or desirable to remove the clip from attached fastening position, the spring leg 25 is flexed outwardly as necessary for the shoulder 27 to clear the marginal edge of the support P, whereupon the clip may be lifted out of engagement with the cable C and the leg member 20 withdrawn from the hole 3 to remove the clip from the assembly. The clip or fastener may then be employed in the same or a similar assembly by a repetition of the foregoing described procedure for applying the clip to attached position.

Figs. 3–5, inclusive, show another form of improved clip or fastener in accordance with the invention that is generally similar in application and use to that described with reference to Figs. 1 and 2, but which is particularly suited for mounting a cable or other rod-like object on an inward area of the support along a path materially removed from the marginal edge of the support. To this end, at each location on the support P' where a clip is to be applied, said support is provided with a pair of mating holes in the form of spaced slots 5, 6, Figs. 3 and 5, on opposite sides of an intermediate well 1' also provided in the support as seen in Fig. 3.

The clip or fastener 30 in this form of the invention is provided in a generally similar construction comprising a base or body 31 having a pair of spaced parallel slots 33 defining the spring arm 35 integrally connected to a transverse portion 36 of said base. The sides of the base 31, likewise, are provided in the form of upwardly curved bridge portions or rounded corrugations 37 which clear the cable C' in the attached position of the clip, while the spring arm 35 has an end portion thereof bent to conform to the contour of the cable C' or other object and otherwise is biased downwardly from the fastener base 31 in its normal untensioned relation as shown in Fig. 4.

A hook-type leg member 40 is provided from one free end of the fastener base 31 and has cutaway portions at its sides providing a flange extending downwardly from the fastener base 31 and defining lateral projections 42 for bearing on the support adjacent the hole 5 to maintain said fastener base 31 in predetermined spaced relation above said support in the applied position of the fastener. The reduced free end portion of said leg member 40 provides a vertical abutment 43 adjoining said lateral projections 42 and an outwardly bent hook portion 44 spaced from the lateral projections 42 a distance approximating the thickness of the support P' so as to snugly engage the underside of said support in cooperation with said lateral projections 42 bearing on the upper side of said support.

A cooperating leg member 45 is formed from the other free end portion of said fastener base 31 and has similar cutaway portions on its sides providing a downwardly directed flange carrying lateral projections 46 for engaging the support adjacent the hole 6 to maintain the adjoining end of the fastener base 31 in predetermined spaced relation above the support P'. The reduced free end portion of said leg member 45 defines a vertical abutment 47 adjacent the lateral projections 46 and is provided with a partially severed tongue 48 formed thereon by a pair of spaced parallel slits intersected by a transverse slit such that the extremity of said tongue defines a shoulder spaced from the lateral projections 46 a distance approximating the thickness of the support P' adjacent the hole 6. Said tongue 48 is bent to project outwardly out of the plane of said leg member 45 so as to engage the marginal edge portion of the opening 6 at the underside of the support, and the end of said leg member 45 is bent inwardly to define an outwardly slanting guide portion 49 leading to said shoulder 48. The leg member 45 is otherwise provided in a predetermined spacing from the leg member 40 slightly greater than the spacing between the holes 5, 6, so that said leg member 45 must be compressed slightly inwardly to be received in its associated hole 6 and thereby engages the outer wall of said hole 6 under spring tension in the applied fastening position of the clip.

This form of the invention is applied in substantially the same way as that of Figs. 1 and 2, in a manner whereby the clip is canted upwardly as necessary for the leg member 40 to be received in and secured in the hole 5 in the support with the hook portion 44 in position to overlap and engage the underside of the support in cooperation with the lateral projections 42 bearing on the upper side of the support and the abutment 43 engaging the adjacent outer wall of the hole 5. The clip is then lowered and pressure exerted on the fastener base 31 and on the leg 45 to enter said leg 45 in the hole 6. The spring arm 35 thereupon engages the cable C' and flexes upwardly from its normal untensioned relation as necessary to accommodate said cable C'. As the leg member 45 enters the hole 6, the guide surface 49 cams against the outer marginal edge or wall of the hole 6 and causes a gradual inward flexing of said leg member 45 as necessary for the shoulder 48 to clear said hole 6 and snap outwardly into positive engagement with the underside of the support adjacent said hole 6. Said shoulder 48 and the lateral projections 46 bearing upon the upper side of the support, accordingly, cooperate in engaging opposite sides of the support adjacent the hole 6 to lock said leg member 45 in secured position in said hole 6. In this relation, the vertical abutment 47 engages the outer wall of the hole 6 under tension to maintain said shoulder 48 in positive engagement with the underside of the support adjacent said hole 6. The clip or fastener 30, as thus applied to attached position on the support P', straddles the cable C' with the spring arm 35 clamping the cable under constant spring tension as seated in the well 1' in the support in the mounted position of said cable on said support. This form of clip or fastener 30 may also be removed from attached fastening position simply by flexing the leg member 45 to move the shoulder 48 inwardly as necessary to permit said leg member to be withdrawn from the hole 6, whereupon the clip may be disengaged from the cable C' and the leg 40 withdrawn from the hole 5 to remove the clip from the assembly.

The clip or fastener, in either form, preferably is constructed of relatively thin sheet metal the thickness of which is selected according to service requirements and the predetermined size of the cable or other part to be secured. The clip or fastener is most effective when provided of spring metal suitably tempered and otherwise treated to give the desired toughness and hardness, particularly in the case of devices which are used in assemblies subject to extreme vibratory motion, or the like. A cheap and highly effective clip or fastener may be provided from cold rolled metal such as cold rolled steel which is untempered but of a spring metal nature and capable of providing an effective and reliable fastening device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A mounting assembly for an elongate article comprising in combination, a pair of plate members disposed in face-to-face relation on opposite sides of the elongate article and being releasably secured together with the article clamped therebetween, one of said plate members being a supporting member provided with a hole spaced from one edge portion thereof and seating said elongate article on its surface in the space between the hole and said one edge portion with the upper side of said elongate article projecting above the surface of the supporting member, the other plate member comprising a sheet metal element having a body portion extending across and overlying said elongate article, said body portion having an inverted substantially U-shaped bend defining an article clamping surface corresponding substantially to the shape of the projecting upper side of said elongate article and engaging the latter, a pair of spaced securing elements extending from the ends of said body portion and at opposite sides of said inverted U-shaped bend, one of said securing elements being releasably secured in said hole and the other of said securing elements comprising a resilient shoulder co-acting in overlapping fastening engagement with said one edge portion of said supporting member, and means on said other securing element for flexing the latter during movement of said plate members into said assembled position whereby said shoulder can move across said one edge portion of the supporting member and snap into said overlapping fastening engagement with said one edge portion.

2. A mounting assembly in accordance with claim 1 wherein said means comprises a slanting guide portion extending outwardly from said resilient shoulder.

3. A mounting assembly for an elongate article comprising in combination, a pair of plate members disposed on opposite sides of the elongate article and being releasably secured together to clamp the article therebetween, one of said plate members being a supporting member provided with a hole spaced a predetermined amount from one edge portion thereof and having an elongate depression on its surface in the space between said hole and said one edge portion, said depression seating the underside of said elongate article with the upper side of said elongate article projecting above the surface of said supporting member, the other plate member comprising a sheet metal element having a body portion extending across and overlying said elongate article, said body portion being formed with a partially severed area having an inverted substantially U-shaped bend defining an article clamping surface corresponding substantially to the shape of the projecting upper side of the elongate article and engaging the latter, a pair of spaced securing elements extending from the ends of said body portion at opposite sides of the inverted substantially U-shaped bend respectively, one of said securing elements comprising a hook releasably secured in the hole in said supporting member, said hook including an outwardly flared lip thereon for facilitating the application of the hook over the marginal edge of said hole, the other of said securing elements comprising a resilient shoulder co-acting in overlapping fastening engagement with said one edge portion of said supporting member, said shoulder including a slanting guide portion extending outwardly from said shoulder for flexing said other of said securing elements during movement of said plate members into final assembled position whereby said shoulder can move across said one edge portion of the supporting member and snap into said overlapping fastening engagement with said one edge portion.

4. A mounting assembly for an elongate article comprising in combination, a pair of plate members disposed on opposite sides of the elongate article and being releasably secured together to clamp the article therebetween, one of said plate members being a supporting member provided with a pair of spaced slots and having an elongate depression on its surface in the space between said slots, said depression sealing the underside of said elongate article with the upper side of said elongate article projecting above the surface of said supporting member, the other plate member comprising a sheet metal element having a body portion extending across and overlying said elongate article, said body portion being formed with a partially severed area having an inverted substantially U-shaped bend defining an article clamping surface corresponding substantially to the shape of the projecting upper-side of the elongate article and engaging the latter, a pair of spaced securing elements extending from the ends of said body portion at opposite sides of the inverted substantially U-shaped bend respectively, one of said securing elements comprising a hook releasably secured in one of said slots in said supporting member, the other of said securing elements comprising a resilient leg member releasably secured in said other slot and having a tongue bent outwardly out of the plane of the leg member to engage the adjacent marginal edge portion of said other slot at the underside of the support, each of said securing elements having at least one outwardly extending projection adapted to bear on the support member to maintain said body portion in spaced relation to said support member.

References Cited in the file of this patent

UNITED STATES PATENTS

| | | |
|---|---|---|
| 794,070 | Assel | July 4, 1905 |
| 1,262,763 | Farley | Apr. 16, 1918 |
| 2,109,213 | Fearing | Feb. 22, 1938 |
| 2,366,456 | Pheazey | Jan. 2, 1945 |

FOREIGN PATENTS

| | | |
|---|---|---|
| 145,256 | Great Britain | July 2, 1920 |

OTHER REFERENCES

Tinnerman Products Catalog. Copyright 1943 received August 4, 1945. Page 15, Fig. 33 and Item No. 5928.